United States Patent [19]
Wolford

[11] 3,994,169
[45] Nov. 30, 1976

[54] MATERIAL DEPTH MEASUREMENT AND INDICATOR

[76] Inventor: Byron F. Wolford, Rte. 1, Fergus Falls, Minn. 56537

[22] Filed: June 27, 1975

[21] Appl. No.: 590,968

[52] U.S. Cl. .............................................. 73/290 R
[51] Int. Cl.² .......................................... G01F 23/00
[58] Field of Search ............. 73/290, 299, 302, 303

[56] References Cited

UNITED STATES PATENTS

| | | | |
|---|---|---|---|
| 1,560,343 | 11/1925 | Foulk | 73/303 |
| 3,290,938 | 12/1966 | Miller | 73/290 R |
| 3,401,562 | 9/1968 | Reany | 73/290 R |

Primary Examiner—Donald O. Woodiel
Attorney, Agent, or Firm—Merchant, Gould, Smith, Edell, Welter & Schmidt

[57] ABSTRACT

Measurement of the depth of material in a container is achieved through the use of an elongated sensor having a flexible member capable of being maintained in a collapsed condition to the extent of immersion by the material. A fluid control and measurement system in communication with a fluid passage in the sensor defined in part by the flexible member is operable to alternately force fluid into and drawn fluid from the portion of the sensor which is not maintained in a collapsed state by immersion in the material. The quantity of fluid thus measured is an indication of the extent of the sensor not yet covered by the material, and hence an indication of the depth of the material in the container.

12 Claims, 5 Drawing Figures

U.S. Patent  Nov. 30, 1976  3,994,169
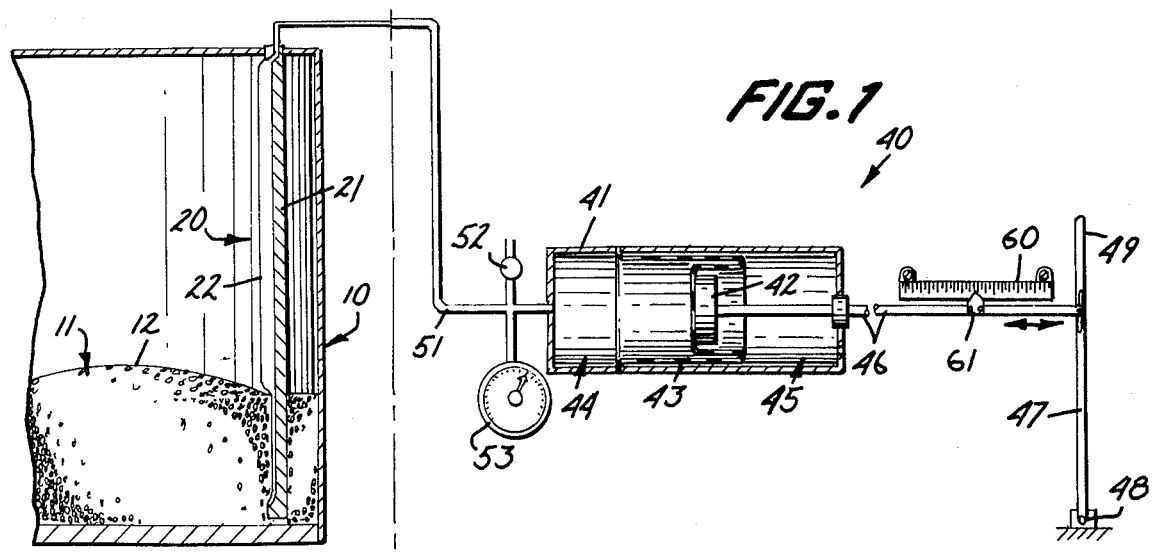
FIG.1
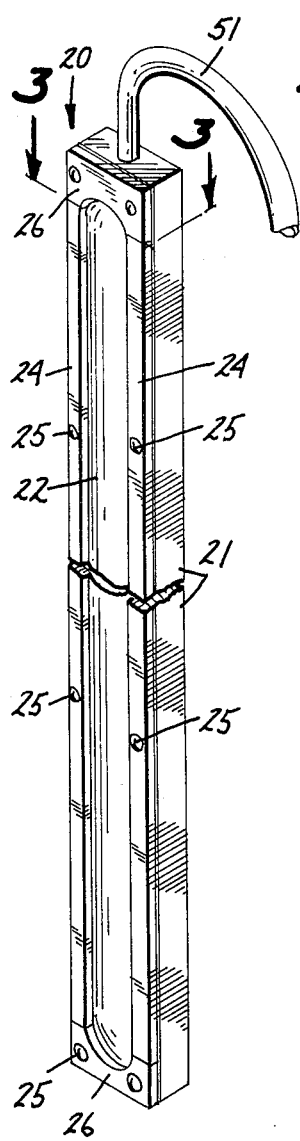
FIG.2
FIG.3
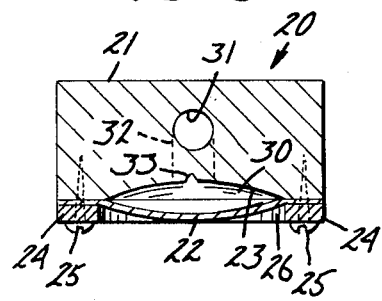
FIG.4
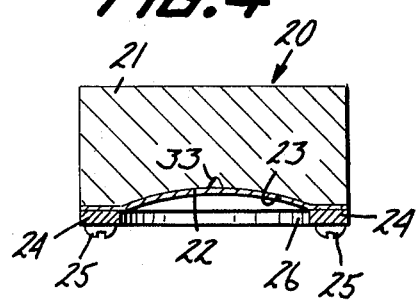
FIG.5
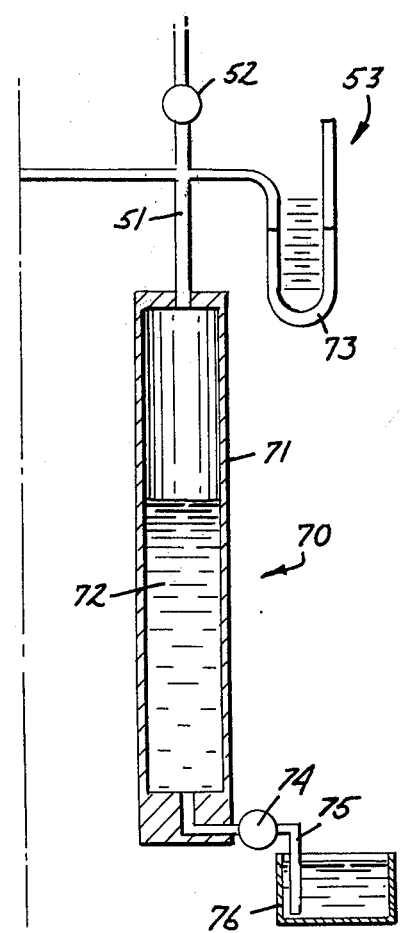

MATERIAL DEPTH MEASUREMENT AND INDICATOR

BACKGROUND OF THE INVENTION

The present invention pertains to systems for measuring and indicating the depth of material in a container.

There are many instances in which it is desirable or necessary to provide a quick measurement of the amount of material stored in a container. In a typical industrial or agricultural setting, a bin or other container is provided for temporary storage of some material, such as grain, feed, cement, carbon black, etc. Typically, quantities of material are added to and withdrawn from the container, from time to time, and the need arises for knowing the amount of material in the container at any given moment.

Although it is in theory possible to provide actual measurement of quantities of material added to and withdrawn from the container, thereby to maintain a tally of its actual contents, such schemes are generally not practical because of the length of time and the degree of complexity involved in making actual measurements of the material. Rather, it is generally preferable to allow for rapid adding or subtracting of material from the container, by conveyor, dump truck, auger, or the like, without the necessity of actual measurement of the material so added or removed. This in turn implies a need for an indirect means of measurement, and preferably one which is quickly and accurately made.

Since the total volume of the container is known, having once been measured or calculated, the simplest method of measuring material in the container involves measurement of the depth of the material at a given time. Because visual inspection is generally inconvenient or impractical, various systems have been proposed in the prior art for measurement of the depth of the material by means of a sensor or sensors placed within the container, and some type of readout means located externally of the such as an office which contains readouts for numerous containers in a given installation.

Sensors for measuring depth of granular material in containers have been proposed which operate electrically, or by fluid pressure. In either case, an elongated sensor or a plurality of sensors are generally placed vertically in the container so as to be progressively immersed in the material as it is added to the container. One type of prior art electrical sensor uses a capacitance probe and circuitry for measuring changes in capacitance as the container fills with material. Unfortunately, such probe often cannot distinguish between solid material or dust settling on the probe, and additionally are subject to stability and calibration problems.

Another type of electrical prior art system has used a resistance probe. The material in the bin is suppose to exert pressure on the probe, causing it to change its resistance characteristics, to the extent of immersion in the material. Another type of prior art electromechanical system involves a series of pressure actuated switches at various depths within the bin. Each switch is operated by a diaphragm which is suppose to be depressed by immersion in the material. A readout device indicating which switches have been thrown indicates the depth of material in the bin.

Prior art fluid type systems have been proposed which involve the use of an elongated sensor mounted vertically in the bin. The sensor has a movable or flexible portion which is intended to be compressed by the accumulating material in the bin so as to displace a quantity of fluid from within the sensor. The fluid bellow or the like is then provided to measure the displaced fluid.

Regardless of whether operated by mechanical or electrical means, prior art systems have suffered from certain problems and inaccuracy due to the amount of force required to actuate or compress the sensor. This is because most dry products develop horizontal forces which are very low compared to the weight per cubic foot of material. This is especially true of very light materials such as carbon black or sawdust, in which the very low horizontal forces approach the limits of the sensitivity of prior art sensors.

It will be appreciated that the prior art sensors depend upon an assumption that the granular material will behave in a quasi-fluid manner, so that the weight or pressure due to the depth of the material will be exerted uniformly in a horizontal, as well as in a vertical direction, as would be the case with a true fluid. Unfortunately, in reality most granular materials behave partially as a solid and only a portion of the total force is distributed horizontally against the sensor.

The weakness of the horizontal forces developed presents a distinct problem in designing a sensor which depends upon the horizontal forces to overcome the inherent preload of the sensor for actuation. The problem is inherently the same, no matter whether the sensor preload is due to the necessity of compressing fluid against a bellows, or the necessity of applying pressure to a resistance probe or overcoming a spring bias in a pressure switch. Often the preload of the sensor has been as great or greater than the weak horizontal forces developed by the material. Needless to say, such a condition will result in inaccurate or inconsistent readings. Further, even though the sensitivity of the sensors in some prior art systems has been made very high, unacceptable results have nonetheless still been obtained, particularly with lightweight granular materials.

The problem is further compounded by the tendency of some materials to cake or bridge in the container—a condition which results in local isolated pockets in which the material behaves entirely as a solid body, with no horizontal forces. Additionally, many dry materials flow freely if held for only short periods of time in a vessel. However, when static storage is involved for an extended length of time, which depends of course on the material involved, they tend to become caked or bridged, in some cases to the extent that they become firm enough for a person to walk on. Materials of this type include powdered coal, clay, cement, flour, carbon black, grain and feed, for example. This caking and bridging is due to a number of diverse causes, including deaeration, chemical changes, presence of moisture, etc. The variability of these factors makes it very difficult to build a sensor and system giving acceptable and repeatable operation.

Because of the complexity and expense involved in building an electrical sensor typically having a great number of switches for installation in a deep container, and because of the potential explosion hazard with electrical systems, it has been recognized that a fluid displacement system would have the advantages of simplicity, safety and lower cost. Unfortunately, these greater theoretic advantages of fluid systems have not been recognized in systems proposed in the prior art because of certain other problems which have not been satisfactorily solved, at least in a feasible and economical manner.

Typical prior art fluid systems use a flexible member or diaphragm defining an air passage, positioned vertically in the container. A fluid communication line from the top of the sensor connects to a bellows, piston, or other displacement indicating device to which is attached an indicating pointer or other readout means. An example of such a system is found in U.S. Pat. No. 3,401,562, issued to W. A. Reaney. As material in the container causes compression of the sensor, the bellows or piston is caused to move in response. Such systems are subject to the major problems of temperature sensitivity and inaccuracies due to leaks in the system, in addition to product bridging and the weakness of the horizontal forces developed in the product as discussed above, upon which such systems must rely for compression of their sensors.

In this type of prior art system, the entire fluid system including the sensor, interconnecting line, and the bellows or other readout device must be sealed from the atmosphere. Unfortunately, this renders the system highly susceptible to erroneous readings caused by temperature changes. When the temperature increases, the air in the system expands, giving erroneous readings, and vice versa when the temperature drops. Of course, use of a liquid instead of a gas as the working fluid would help in this respect, but it is generally not feasible to do so, because the density of the liquid would build up a significant pressure head in the elongated vertical sensor, requiring excessive and unrealistic displacement forces to be supplied by the material.

In order to overcome temperature problems, systems have been proposed in the prior art which include elaborate temperature compensating bellows, as shown in U.S. Pat. No. 3,290,938 issued to R. R. Miller for example. Unfortunately, this proposed solution leads to greater complexity and increased costs, and potentially increases the vulnerability of the system to leaks.

Because the prior art fluid systems depend upon a completely sealed fluid system, the presence of even a minute leak will seriously affect long term accuracy. Although it is possible to build a system relatively free of gross leaks, the extent of the sensor, and the other tubes and devices involved in the measurement system makes it extremely difficult to guard against long term, slow leaks which will degrade accuracy over a period of weeks or months. Generally recalibration in this type of prior art system is not feasible, short of completely emptying or completely filling the container.

The present invention solves these and other problems existing in the art by providing an improved depth measurement system which takes advantage of the inherent simplicity and economies of a fluid system, but which works upon a different principle so as to avoid the problems heretofore existing in the art.

SUMMARY OF THE INVENTION

According to the present invention, there is provided a system for measuring the depth, and hence the quantity of material in a container. An elongated sensor having a flexible member defining a fluid passage is adapted for positioning in a container. Except when a measurement is being made, the fluid sensor is either vented to the atmosphere, in which case the flexible member is unsupported and collapses readily, or the flexible member is maintained in a collapsed condition by maintaining a zero or a negative pressure therein.

Fluid control and measurement means are provided for measuring the extent of immersion by material in the container, by measurement of the volume of the portion of the sensor above the level of immersion. This is in contrast to the prior art systems which attempt to measure the volume of fluid displaced from the sensor by the portion below the level of immersion.

The fluid control means of the present invention operates in one mode to draw fluid from the sensor so as to collapse the flexible member. The fluid control means operates in another mode to force fluid into the sensor so as to distend the portion of the sensor not immersed by the material. Although the measurement procedure outlined above mentions deflation to the negative pressure reference point prior to inflation to the positive pressure reference point, it will be appreciated that the order in which the two measurements are made can be reversed. The object of the measurement cycle is to measure the volume of the upper portion of the sensor which is not maintained in a collapsed position because of immersion in the product; and this result can be achieved regardless of the order in which the measurements are made.

Measurement means associated with the fluid control means measures the quantity of fluid required to distend the upper portion of the flexible membrane not maintained collapsed by the material in the container. This measurement originally taken with the container empty, gives the fraction or proportion of the container which remains empty. Simple calculation then gives the proportion or percentage of the container which is filled.

The influence of bridging and caking of material is minimized in the present invention because practically no force is required to collapse the flexible member in the present invention. Since no attempt is made to measure positive displacement by the material as in the prior art, the present system can be simply vented to the atmosphere until a measurement is to be taken, or the flexible member can be collapsed by applying a negative pressure, then maintained collapsed by applying a zero or negative pressure. Thus, the flexible member of the sensor offers no resistance to collapsing during the container filling operation.

When a measurement is to be made, the vent to the atmosphere is closed, and fluid is pushed into and drawn out from the sensor (in either order) to cause the nonimmersed portion to distend and contract. This forced cycling of the diaphragm serves to break up any bridging which might otherwise occur around the sensor.

Since the volume of the unimmersed portion of the sensor is measured positively and very quickly under control of the control means, and since the system is otherwise vented or maintained at a slight negative pressure, the presence of slow, long term leaks, is generally of no consequence. The inevitable slow leaks which develop over time will have negligible effect upon accuracy since the system is essentially "recalibrated" by deflation and inflation and a new zero point established on each measurement cycle.

Although the present invention is equally applicable to measurement of liquids in a container, its greatest advantages exist with respect to measurement of granular or dry material, because it overcomes problems existing with prior art systems for this purpose. Because of their true fluid behavior, a condition which is only approximated by granular dry materials, liquids are amenable to other types of measurement systems, as generally known in the art.

BRIEF DECRIPTION OF THE DRAWING

In the drawing, FIG. 1 is a diagrammatic view of a depth measuring system according to the present invention;

FIG. 2 is a view in perspective of the sensor of the system of FIG. 1, portions thereof being broken away;

FIG. 3 is a view taken generally along line 3—3 of FIG. 2;

FIG. 4 is a view similar to that of FIG. 3, showing the sensor in an alternate position; and FIG. 5 is a diagrammatic view of an alternate embodiment of the present invention.

DESCRIPTION OF THE PREFERRED EMBODIMENT

Referring to FIG. 1, reference numeral 10 generally designates a container or bin for the storage of material. Reference numeral 11 designates the material, which is granular or powdered dry product, although as previously mentioned, the present invention will work with liquids also. In FIG. 1, container 10 is filled with material up to the level 12, which in practice may not be perfectly level, but may be conical if material is poured into the container. Conversely, the level may be concave if material is discharged from a bottom opening. Obviously for greatest accuracy, these effects should be taken into account, but for most applications the measurement of level 12 in general will be accurate enough for most purposes.

A sensor assembly 20 is positioned in container 10. The sensor assembly is elongated in configuration, and is adapted to be vertically placed in the bin, with a height corresponding to the depth of material which is to be measured. Although the sensor 20 can be placed anywhere in the bin, in most cases it will be placed towards one side so as to be out of the way during loading and unloading operations.

The sensor assembly 20 comprises a backing member or baseboard 21, and a flexible member, or diaphragm, 22. The diaphragm 22 cooperates with the backing 21 to define a fluid passageway therein. As indicated in FIG. 1, diaphragm 22 is capable of being collapsed or compressed by the material 11, to the extent of its immersion therein.

Sensors of this general type are known in the prior art, and generally speaking, any sensor having a flexible diaphragm as is known in the prior art will work in the novel system according to the present invention. Thus, any type of sensor meeting these requirements may be used, whether or not it has a backing board, or whether it comprises a tube or bladder suspended or positioned in the container. For best results, the improved sensor described herein with reference to FIGS. 2, 3 and 4 is preferred, but the system will work with other types of sensors.

The reason the present invention gives improved results even using prior art types of sensors is a result of the fluid control and measurement means according to the present invention. Reference numeral 40 generally designates the fluid control and measurement means according to the presently preferred embodiment. A cylinder housing 41 is provided, having a sealed piston assembly 42 positioned therein. Piston 42 connects to the cylinder wall by means of a flexible bellows-type diaphragm 43, to provide a good seal. Of course, any type of piston may be used, for example employing O-rings as a seal, but the sealed piston of FIG. 1 is presently preferred.

On one side of piston 42 within the cylinder, there is defined a chamber 44, and on the back side of piston 42 is a chamber 45, which may be vented to the atmosphere. A piston rod 46 connects from piston 42 through a suitable bushing or slideable bearing to pivotally connect with an actuating lever 47.

Actuating member 47 has its one end pivotally connected at 48 to a support, which may for convenience be a portion of a frame assembly (not shown) which support cylinder 41. The other end of the actuating lever, 49, serves as an operating handle for the fluid control means.

Chamber 44 connects through a conduit 51 to the sensor 20, and more specifically to the interior of the fluid passage formed by the diaphragm. Conduit 51 also connects through a valve 52 to the atmosphere. A pressure indicating device 53 is also connected in communication with conduit 51. This pressure indicating device may be a simple air pressure gauge, manometer, or any other suitable means for measuring the pressure within conduit 51 at a given moment.

As previously mentioned, the present system works best with a gas as the working fluid, rather than a liquid, because of pressure head problems which would be associated with a column of liquid in a sensor such as 20. Any gas can be used as the working gas, but air is preferred both for convenience and for ease in venting as explained hereinafter.

The function of the fluid control means, which includes piston 42 in the embodiment of FIG. 1 is to force air into and out of diaphragm 22, during a measurement cycle. Means are then provided for measuring the quantity of air thus required to distend and collapse the diaphragm. In the embodiment of FIG. 1, this function is performed by means of a scale or rule 60 which is mounted by suitable means (not shown) in fixed relationship with cylinder 41, and a pointer 61 which is slideably positioned on piston rod 46. Preferably, pointer 61 is mounted with a tight friction fit to piston rod 46, so that it can be moved therealong intentionally for indexing with respect to scale 60, but will not ordinarily be dislodged by accident, and normally will move with piston rod 46.

As previously mentioned, the present invention operates by making a measurement of the volume of the sensor which is not held in collapsed position by the material 11, i.e., the portion above line 12. This is in distinct contrast with the prior art, which attempts to measure the amount of air displaced from a sealed system by the material in collapsing the portion of the sensor below the top of the material level.

In operation, in the embodiment of FIG. 1, a measurement cycle must be performed with the container empty, or alternatively before the sensor is installed in the container. Once this base line data or measurement is made, it does not have to be repeated. With the container empty, the handle 49 is moved towards the right which causes air to be drawn from the sensor, thereby collapsing it because of internal negative pressure. This process is continued while watching the pressure gauge 53. When a predetermined slight negative pressure is achieved, the vent is closed, motion is stopped, and the pointer 61 is slid on control rod 46 to a convenient reference mark, which may be a zero mark, on scale 60. The vent 52 is closed during a measurement cycle, so that the system is sealed during the few moments required for measurement cycle.

The actuating lever handle 49 is then pushed towards the left, thereby forcing air into the diaphragm 22, causing it to distend. When the pressure indicating device 53 indicates a predetermined slight positive pressure buildup, motion of the actuating lever is stopped and held while the indication on the scale 60 opposite pointer 61 is read and recorded. The travel of pointer 61 from the zero reference mark to the second reference mark represents a full scale travel, corresponding to the quantity of air representing the maximum volume of the sensor when fully inflated. For convenience, scale 60 can be calibrated so that the range representing this full scale can be marked off in units of percentage i.e., zero to 100 percent. Alternatively, it could be marked off in other units of volume or linear measurement corresponding to the actual volume of depth of the container being used.

The purpose of pressure indicating device 53 is to make sure that measurements are consistently made at the same negative and positive pressures representing complete collapse and distention, respectively of the diaphragm. Since air is compressible, it would be possible by applying very large forces to actuating lever during the air withdrawal mode, to draw a very high vacuum in chamber 44, conduit 51 and to move piston 42 further to the right, even after the diaphragm is completely collapsed. A similar thing could happen during the portion of the measurement mode in which air is being forced into the diaphragm. Once the diaphragm was fully distended, continued movement of the piston toward the left could result in further compression of air in the system giving erroneous readings of displacement on the scale 60. Since this extra displacement would otherwise be interpreted as the change in volume in the sensor, it is necessary to standardize all readings at the same vacuum and pressure in the system.

In practice, it has been found convenient to make all measurements during air removal mode at a standardized negative pressure of approximately 2 inches of water. Similarly, all measurements during the mode in which the diaphragm is fully distended are made at a positive pressure of approximately 2 inches of water. It will be understood that any other standard reference pressures could be used, so long as they insure consistent collapse and distension of the diaphragm.

Once the initial base line measurements are made, valve 52 can be left open until a measurement is required, which could be a few minutes or many days hence. With valve 52 open, the system is vented to the atmosphere and diaphragm 22 will offer essentially no resistance to being collapsed by material 11 which may be filled into the container. In other words, with the vent open, the diaphragm is essentially limp and even the low horizontal forces existing in some lightweight dry product should be enough to collapse the diaphragm. If necessary, valve 52 can be closed and a slight negative pressure bias can be applied to the system such as by placing a weight or bias spring on the actuating lever. This would positively insure that the diaphragm is in a collapsed condition when the material settles around it.

When it is desired to make a measurement of the amount of material in the container, vent 52 is closed, if it was previously open, and a measurement cycle is initiated. Normally, the system is first brought down to the reference negative pressure and the pointer 61 is indexed. This insures that the entire diaphragm 22 will be collapsed.

At this point in the measurement cycle, it may be necessary to reindex pointer 61 to the zero reference mark. This is because the position of piston 42 may be at any generally arbitrary position when the valve 52 is closed in order to make the measurement. Also the air temperature may have changed since the initial base line measurement, so that in general there is no reason why the pointer 61 should automatically return to the zero reference mark.

After the pointer 61 is reindexed to the zero reference mark, the piston is pushed in the other direction to the positive pressure reference point. As previously mentioned, the positive pressure point is chosen to be low enough to insure that the upper portion of the diaphragm fully distends, but not so great as to push the lower portion of it out againt the weight of the material.

With the piston at its positive pressure reference point, the reading on scale 60 opposite pointer 61 is noted. The difference between this reading and the zero reference mark, in comparison with the original base line measurement is the proportion or percentage of the total bin volume which has not yet been filled by the material. Simple calculation then shows what portion or percentage has been filled.

Alternatively, if the index scale 60 is suitably calibrated, the pointer 61 can read out directly in terms of desired units of measure of capacity remaining in the container.

The sequence of operation of the fluid control means during a measurement cycle is immaterial, so that either mode of operation can be performed before the other.

It will be appreciated that since the measurement cycle takes only a moment or two at the most, and since pressure on the system is maintained at positive and negative reference points during measurments, any small leaks in the system will have only negligible effect upon the accuracy of the readings. Since in the preferred mode, the diaphragm is drawn to a negative pressure, then filled with a slight positive pressure, the initial collapse of the diaphragm may well serve to break any bridges of material which have built up around the sensor.

It will also be appreciated that any convenient means may be used for measuring the volume of air moved during the measurement cycle, representing the volume of the sensor which is above the level of the material. For example, in place of scale 60 and pointer 61, a suitable indicating device could be placed on the piston or cylinder, on the actuator level, or any other means of measuring quantity of air flow could be employed.

Thus the present invention overcomes problems with prior art sensors, whether fluid or electromechanical, because the present invention does not rely upon the weak horizontal forces in many dry products, discussed above, to actuate the sensor. Instead, in the present invention the sensor is vented to the atmosphere so that it offers essentially no resistance to being collapsed by the dry product during the filling of the bin. Further, if a particular dry product does not even develop enough horizontal force to move the flexible diaphragm even though it is vented to the atmosphere, the diaphragm can be positively held in a collapsed state by applying a slight negative pressure thereto.

Stated another way, the present invention overcomes the prior art problems by taking advantage of the following property of dry products. In many cases, the horizontal forces developed represent nothing more than whatever force is exerted by the material as it slides down the angle of repose of the material accumulating in the bin. With low density materials, such forces are very weak indeed. However, once the product has come to static rest and occupies all available volume, it becomes quite immovable except perhaps at the very surface. Very large forces would then be required to move or compress it. Accordingly, rather than requiring the initial weak forces developed by the material as it slides down its angle of repose to actuate the sensor, as in the prior art, the present invention lets the material settle in and around the collapsed sensor which then keeps the sensor collapsed while a measurement cycle is being made.

In other words, prior art systems require the product to act on the sensor, while the product is moving dynamically but in an unpredictable and nonuniform manner. In the present invention, the sensor acts on the product, after it has come to rest.

Similarly, as shown in FIG. 5, any other type of fluid control means could be used to collapse and expand the diaphragm during the measurement cycle. In FIG. 5, a column of water, generally designated by reference numeral 70, is used as a piston or air pump. In column 70, a cylinder 71 has a quantity of water 72 therein. The upper portion of the cylinder 71 connects into the conduit system 51 as before. In FIG. 5, the pressure indicating device 53 is seen to comprise a manometer 73 for measuring air pressure in the conduit, although again, any suitable pressure gauge could be used. A reversible pump 74 is connected to the water column 72, and the pump connects through a conduit 75 to a measuring tank 76. In operation, the reversible motor 74 is operated in the first mode where water is pumped from column 72 into the measuring tank 76. This draws down the water level in the column, drawing air from conduit 51 and from the sensor. This process continues until the negative pressure reference point is reached at manometer 73. The process is then reversed, with the reversible pump 74 operating in its other mode to pump water from the measuring tank 76 into the column 72, thus displacing air into the sensor. When the positive pressure point is reached, the pump is stopped. Measurement of the quantity of water pumped to and from measurement tank 76 gives an indication of the proportion of the sensing diaphragm which is not immersed in the material. The measurement can be made by any suitable fluid flow rate measuring device and integrator, such as by integrating the output of a positive displacement pump, or by a depth indicator in tank 76. As before, base line measurement is made with the container empty, and additional measurements are made whenever needed. Vent 52 can be opened between measurements.

Referring now to FIGS. 2, 3 and 4, an improved sensor according to the present invention is shown. Sensor 20 in FIG. 2 comprises a baseboard 21, which may be made of any suitable rigid material such as wood, plastic or metal. Baseboard 21 is made long enough to correspond to the depth to be measured in a given tank. Alternatively, a number of shorter sensor sections can be interconnected in series to achieve the desired depth. As shown in FIGS. 3 and 4, which are cross sectional views of FIG. 2, the baseboard 21 has a generally concave surface 23 formed in one face thereof and extending longitudinally substantially the entire length of the baseboard. The flexible member or diaphragm 22, may be a long narrow sheet or rubber or other flexible material which may be fastened to the baseboard along the edges thereof by any suitable means. For example, in the presently preferred embodiment shown in FIGS. 2, 3 and 4, the diaphragm is affixed to the baseboard by means of a molding 24 along the edges thereof, held in place at intervals by screws 25, so as to form an air tight seal between the flexible diaphragm and the baeboard. Rounded end pieces 26 similarly seal the ends of the diaphragm to the baseboard.

Other construction techniques are of course possible to secure the diaphragm to the baseboard. For example, the flexible diaphragm could be made with an oval or lens-shaped cross section with the back side of the flexible diaphragm adhered to the baseboard. The flexible diaphragm itself would then define an enclosed air passage, rather than using the baseboard in conjunction with the diaphragm to define the air passage, as in the embodiment of FIGS. 2, 3 and 4.

The width of diaphragm 22 is carefully controlled when it is affixed to the baseboard 21 so as to have an arched or bowed configuration, as indicated in FIG. 3. The radius of this arc is chosen to be substantially the same as the radius of the concave surface 23. Thus, when the diaphragm is distended or inflated, it expands as shown in FIG. 3, leaving an air pressure 30 inside. When the diaphragm is collapsed, either by material or by negative air pressure applied thereto, it contracts as shown in FIG. 4 to coincide with the curvature provided.

As shown in FIG. 2, conduit 51 connects to a hole 31, preferably near the top of the sensor. At any rate, hole 31 communicates internally via a passage 32 to the air space 30, as shown in FIG. 3. A small channel 33 is provided in the concave surface 23 of baseboard 21. This channel preferably runs longitudinally down the length of the sensor. Its purpose is to insure fluid communication from conduit 51 over the entire extent of diaphragm 22, during the deflation part of the measurement cycle. Channel 33 prevents the possibility of an upper portion of the diaphragm being drawn tightly against the surface 23 during evacuation, leaving an air pocket trapped in its lower portion.

Thus, according to the present invention, there is provided an improved material depth measuring and indicating system, which overcomes the problems of leakage, temperature dependence, and material bridging which exist in the prior art. Another aspect of the present invention provides an improved sensor for use in such a system.

I claim:

1. Apparatus for measuring the depth of material in a container, comprising an elongated sensor adapted for positioning in a container, said sensor having a flexible member defining a fluid passage, and said flexible member capable of being held collapsed to the extent it is covered by material in the container, and means connected to said fluid passage for measuring the extent of said flexible member not covered by material in the container by measuring the amount of fluid required to extend and collapse the portion of said flexible member not held collapsed by the material in the container.

2. Apparatus for measuring the depth of material in a container, comprising:
   a. an elongated sensor adapted for positioning in a container, said sensor having a flexible member defining a fluid passage, said flexible member capable of being collapsed to the extent it is covered by the material in the container;
   b. fluid control means connected with said fluid passage of said sensor and operable in one mode for drawing fluid from said sensor so as to collapse said flexible member, and operable in another mode for forcing fluid into said sensor so as to distend the portion of said flexible member not maintained in a collapsed condition by the material in the container; and
   c. measurement means associated with said fluid control means for measuring the quantity of fluid required to collapse and distend the portion of said flexible membrane not maintained collapsed by the material in the container, whereby to measure indirectly the depth of material in the container.

3. Apparatus according to claim 2 further including means for maintaining said flexible member in collapsed condition between the taking of measurements.

4. Apparatus according to claim 2 further including a controllable vent in communication with said fluid passage, for venting said sensor to the atmosphere inbetween the taking of measurements.

5. Apparatus according to claim 2 wherein said fluid control means includes means for maintaining a negative pressure within said fluid passage within said sensor at times other than when measurements are being made, to insure that said flexible member is collapsed when covered by material in the container.

6. Apparatus according to claim 2 wherein said fluid control means comprises a cylinder having a movable piston, for drawing fluid from and forcing fluid into said sensor.

7. Apparatus according to claim 6 wherein said measurement means comprises an index scale associated with said piston for measuring the movement thereof.

8. Apparatus according to claim 2 wherein said fluid control means comprises a member including a water column, the upper portion of said member being in fluid communication with said fluid passage, and further including a pump for transferring water to and from said water column.

9. Apparatus according to claim 8 wherein said measurement means comprises means for measuring the quantity of water transferred by said pump.

10. Apparatus according to claim 2 further including a pressure measurement device in communication with said fluid passage of said sensor.

11. A sensor for use in a system for measuring the depth of material in a container, comprising:
   a. an elongated backing member, said member having an elongated convex surface formed therein;
   b. an elongated flexible diaphragm;
   c. means for attaching said diaphragm to said backing member along the sides thereof to define a fluid passage between said diaphragm and said convex surface; and
   d. the width of said diaphragm sized in relation to said convex surface so as to be nestable therein with the diaphragm conforming thereto when said fluid passage is collapsed.

12. The sensor according to claim 11 wherein said elongated backing member has an elongated channel formed in said convex surface.

* * * * *

UNITED STATES PATENT OFFICE
CERTIFICATE OF CORRECTION

Patent No. 3,994,169            Dated November 30, 1976

Inventor(s) Byron F. WOLFORD

It is certified that error appears in the above-identified patent and that said Letters Patent are hereby corrected as shown below:

Column 10, line 6, following the word sheet, "or" should read --of--.

Column 10, line 14, "baeboard" should read --baseboard--.

Column 10, line 33, "pressure" should read --passage--.

Signed and Sealed this

First Day of March 1977

[SEAL]

Attest:

RUTH C. MASON
*Attesting Officer*

C. MARSHALL DANN
*Commissioner of Patents and Trademarks*